United States Patent
Han

(10) Patent No.: US 12,258,932 B2
(45) Date of Patent: Mar. 25, 2025

(54) WAVE ENERGY CONVERSION DEVICE

(71) Applicant: Hann-Ocean Energy Pte. Ltd., Singapore (SG)

(72) Inventor: Lei Han, Nantong (CN)

(73) Assignee: Hann-Ocean Energy Pte. Ltd., Singapore (SG)

( * ) Notice: Subject to any disclaimer, the term of this patent is extended or adjusted under 35 U.S.C. 154(b) by 0 days.

(21) Appl. No.: 18/400,353

(22) Filed: Dec. 29, 2023

(65) Prior Publication Data
US 2024/0141863 A1    May 2, 2024

Related U.S. Application Data

(63) Continuation-in-part of application No. PCT/CN2021/109454, filed on Jul. 30, 2021.

(30) Foreign Application Priority Data

Jun. 29, 2021   (CN) .......................... 202110733209.9

(51) Int. Cl.
*F03B 13/22*   (2006.01)
(52) U.S. Cl.
CPC .................................... *F03B 13/22* (2013.01)
(58) Field of Classification Search
CPC ....................................................... F03B 13/22
See application file for complete search history.

(56) References Cited

U.S. PATENT DOCUMENTS

| 3,687,567 A | 8/1972 | Lininger |
| 9,222,456 B2 * | 12/2015 | Han ................ F03B 13/145 |
| 2011/0291417 A1 | 12/2011 | Han |

FOREIGN PATENT DOCUMENTS

| CN | 102187086 | 9/2011 |
| CN | 202867081 U | 4/2013 |
| EP | 2 574 771 | 4/2013 |
| JP | 11-117847 | 4/1999 |
| KR | 10-0335651 | 5/2002 |
| KR | 10-2011-0115655 | 10/2011 |
| WO | 2006/102694 | 10/2006 |

OTHER PUBLICATIONS

International Search Report issued in International Application No. PCT/CN2021/109454, Mar. 21, 2022, 7 pages w/translation.

* cited by examiner

*Primary Examiner* — Viet P Nguyen
(74) *Attorney, Agent, or Firm* — HSML P. C.

(57) ABSTRACT

A wave energy conversion device mainly includes a pair of one-way flow guiding grates, a hydropower turbine, and a housing containing the above mentioned items. An inlet chamber and an outlet chamber are provided within the housing. The inlet chamber has a first opening, and the outlet chamber has a second opening. Both the first and the second openings are oriented generally facing a front of the device toward incoming waves. The first and second openings are also oriented such that the first and second openings face each other with an angle ranging from 30 degrees (including 30 degrees) to 180 degrees, forming a transverse V-shape in a longitudinal cross-section of the housing. A first one-way flow guiding grate is installed on the first opening, and a second one-way flow guiding grate is installed on the second opening.

12 Claims, 6 Drawing Sheets

WAVE ENERGY CONVERSION DEVICE

TECHNICAL FIELD

The present disclosure relates to the field of clean energy utilization, particularly wave energy conversion devices.

BACKGROUND TECHNOLOGY

With development of industrial scales, demand for energy has increased. The increase in energy prices has led to the consideration of various alternative energy sources. On the other hand, traditional fossil fuels have brought about tremendous carbon emissions and pollution effects that are difficult to eliminate. In recent years, new clean energy sources such as wind energy and solar energy have been increasingly applied, but problems of low energy density and unstable energy supply occur in association with these types of energy supplies.

Wave energy, as a specific form of ocean energy, is also one of the main energy sources in the ocean. Its development and utilization are very important for alleviating energy crises and reducing environmental pollution. The huge, eternal, and environmentally friendly energy generated by the movement of waves can be fully utilized if the kinetic energy of waves and other surface waves are utilized. The prospects for global energy are promising and bright. In addition, wave energy conversion devices can also be used as effective wave energy absorption devices.

Currently, some industry leaders have made various meaningful attempts at wave power generation. However, shortcomings such as low efficiency in converting wave energy to electricity exist, and thus current options are not economically practical. Also, one of problems in association with existing technologies may be caused by a symmetrical setup of an inlet chamber. This symmetrical set up may cause an incompatible flow pattern of water entering the hydropower turbine stator's asymmetrical vanes, and results in a loss of efficiency. In addition, a symmetrical setup of an inlet chamber also causes water to slosh inside the inlet chamber, causing secondary waves or turbulence. This again can cause waste of more kinetic energy of the waves that come in.

Therefore, there is a need for a design of wave energy converter with improved efficiency and stability.

SUMMARY

The present disclosure discloses wave energy conversion devices that can enhance efficiency and stability of wave energy conversion.

A wave energy conversion device has a pair of one-way flow guiding grates, a hydropower turbine, and a housing. An inlet chamber and an outlet chamber are provided within the housing. The inlet chamber has a first opening, and the outlet chamber has a second opening. The first opening and the second opening are oriented to generally fact a front of the device toward a direction in which waves come into the device. The first opening and the second opening face each other with an angle ranging from 30 degrees (including 30 degrees) to 180 degrees, forming a transverse V-shape in a longitudinal cross-section of the housing. The pair of one-way flow guiding grates includes a first one-way flow guiding grate and a second one-way flow guiding grate, with the first one-way flow guiding grate installed on the first opening and the second one-way flow guiding grate installed on the second opening, respectively. The first one-way flow guiding grate only allows water to flow into the inlet chamber, and the second one-way flow guiding grate only allows water to follow out from the outlet chamber. The housing provides a greater opening in the front of the device, compared with other sides of the device, to allow the inlet chamber and outlet chamber to access seawater outside of the device.

The inlet chamber and the outlet chamber are connected to each other through a duct, in which a hydropower turbine is installed and directly connected to a rotary electricity generator installed above the housing through a shaft.

The inlet chamber and the outlet chamber are located in the housing in an asymmetric manner. Both inlet chamber and outlet chamber are connected to the top portion of the housing, where air ventilating openings are provided.

The inlet chamber has a front section and a rear section. The front section has a horizontal cross-section having a quadrilateral shape. The quadrilateral-shape cross section has a wider outer edge located on the front wall of the housing facing waves. A bottom of the front section includes the first one-way flow guiding grate slanting in a front-higher rear-lower orientation. The rear section has a horizontal cross-section surrounded by a length of helix that intersects two side edges of a corresponding quadrilateral cross section of the front section, with one side edge being located on a tangent of the first end portion of the helix and the other side edge intersecting a second end portion of the helix. A front side of the of the rear section is in fluid communication with the front section of the inlet chamber. A bottom of the rear section is in fluid communication with a bottom of the front section of the inlet chamber. A hydropower turbine chamber is located at the bottom of the rear section of the inlet chamber, and configured to accommodate the hydropower turbine. The hydropower turbine chamber is in communicate with the outlet chamber. The helix is an involute helix, and tangent to the side edge of the corresponding quadrilateral-shape cross section of the front section, with the first end portion being an outer end of the involute helix, and the second end portion being an inner end of the involute helix.

A through-hole is provided at the top of the rear portion of the inlet chamber to allow a shaft of the hydropower turbine to extend through and be connected to a generator located above the housing. A rotor of the hydropower turbine is connected to the shaft of the hydropower turbine. The shaft is provided with a sleeve having an outer diameter that is about 0.25 to 0.5 times of a diameter of the rotor. The hydropower turbine includes a stator cooperating with the rotor. The stator is disposed in front of the rotor relative to the direction of the water flow, with the stator and rotor having opposite facing angles relative to the water flow.

In addition to the inlet chamber, an energy alternating chamber, and the hydropower turbine chamber, the remaining portion of the housing forms the outlet chamber. A lower portion of the outlet chamber is in fluid communication with the bottom of the rear section of the inlet chamber through the hydropower turbine chamber. The lower portion of the outlet chamber has the second one-way flow guiding grate slanting in a rear-higher front-lower orientation toward a lower end of an intake/discharge port of the wave energy conversion device. and an inner upper edge of which is connected to the lower part or bottom of the inlet chamber. The first and second one-way flow guiding grates are disposed in a transverse V-shape, which forms an angle ranging from 30 degrees (including 30 degrees) to 180 degrees.

The inlet and outlet are provided with an anti-fouling grille. The bottom of the housing and the rear wall of the housing are connected through a curved transition. A plurality of wave energy conversion devices can be connected with each other for use.

The technologies disclosed in this application can improve a hydrodynamic response of a wave energy conversion device to wave energy by substantially changing an inlet chamber configuration, resulting in more stable potential and kinetic energy of a water flow going through the inlet and outlet chambers. This improves wave-to-electricity conversion output stability. The asymmetric arrangement of a rear section of the inlet chamber can guide the water flow toward one side of the hydropower turbine's inlet, thereby generating a high-speed vortex. By carrying a large momentum, the vortex can stabilize the water flow pattern in the rear section of the inlet chamber and can reduce the reflective waves inside the inlet chamber. An angle of the water flow entering stator vanes of the hydropower turbine is optimized to be more consistent to improve the efficiency of the hydropower turbine with a high-speed vortex. A V-shape of the inlet chamber can improve the energy concentration effect and energy absorption efficiency. The orientation of the pair of one-way guide grates disposed in a transverse V-shape can help reduce a draught requirement, thereby, reducing manufacturing and installation costs. A curved transition between the bottom and the rear wall of the housing can help reduce vortex at the bottom of the housing, thereby improving efficiency of the outlet chamber drainage or improving the efficiency of energy absorption. A large number of wave tank tests (more than 1,600 times) and computer simulations have confirmed that wave energy conversion devices disclosed herein can more efficiently convert wave energy to electrical energy or improve the efficiency of absorbing energy, and at the same time substantially improve stability of the output power. Compared with the prior art mentioned in the background technology, the technologies disclosed herein show higher efficiency and more stable power output under the same design working conditions, and the production cost can be further reduced due to the smaller size of the wave energy conversion device compared with existing devices.

BRIEF DESCRIPTION OF THE DRAWINGS

In order to more clearly illustrate the technical solutions in the specific embodiments of wave energy conversion devices, the accompanying drawings to be used in the description of the specific embodiments will be briefly introduced below, and it will be evident that the accompanying drawings in the following description are some of the embodiments of wave energy conversion devices, and that, for one of skill in the art, it will be possible to obtain other drawings on the basis of these drawings without putting in any creative labor.

DETAILED DESCRIPTION

The technical solutions in the embodiments of wave energy conversion devices will be clearly and completely described below in conjunction with the accompanying drawings in the embodiments of wave energy conversion devices. Obviously, the described embodiments are only a portion of the embodiments of wave energy conversion devices and not all the embodiments. The components of embodiments of wave energy conversion devices generally described and illustrated in the accompanying drawings herein may be arranged and designed in various configurations. Accordingly, the following detailed description of embodiments of wave energy conversion devices provided in the accompanying drawings is not intended to limit the scope of wave energy conversion devices for which protection is claimed but rather represents only selected embodiments of wave energy conversion devices. Based on the embodiments of wave energy conversion devices, all other embodiments obtained by a person skilled in the art without creative labor are within the scope of protection of wave energy conversion devices.

Figure 1:
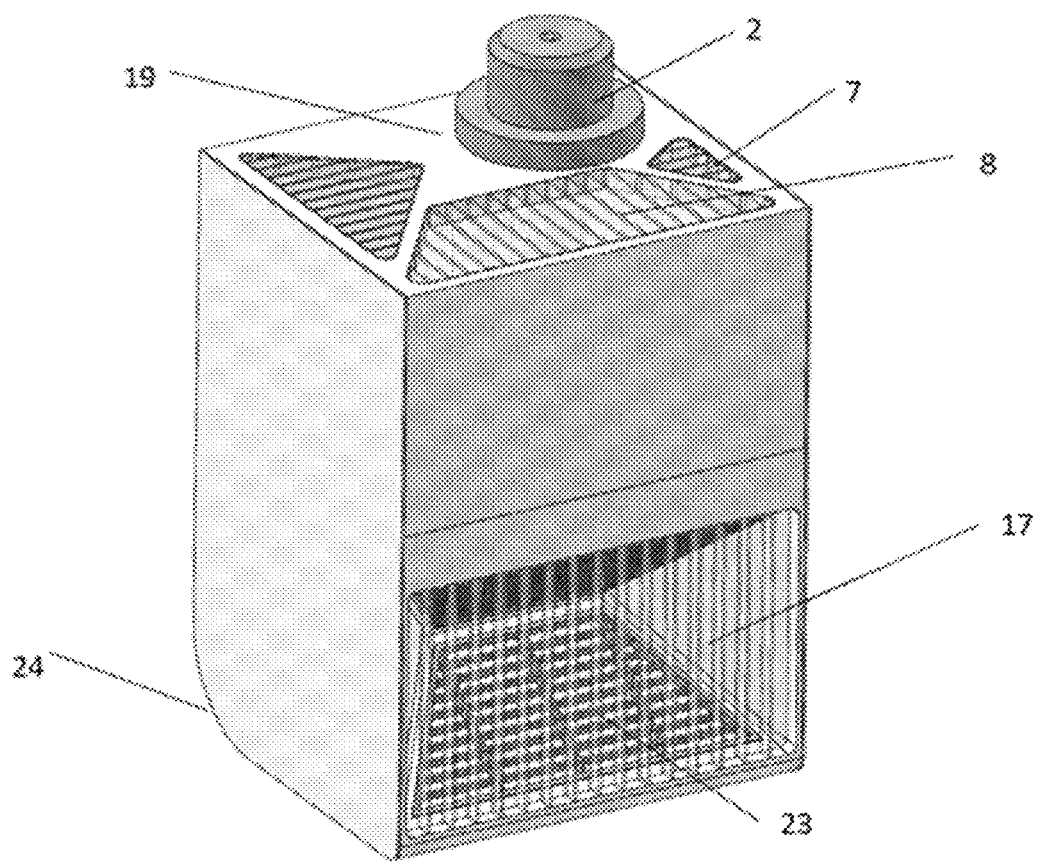
FIG. 1 is a schematic view of an embodiment of a wave energy conversion device.

A wave energy conversion device is described in further detail below to enable those skilled in the art to implement it with reference to the explanatory text. Referring first to FIG. 1, FIG. 1 is a schematic view of an embodiment of a wave energy conversion device. In the embodiment of FIG. 1, the wave energy conversion device is a container with a housing defined as a front end on the side facing the waves, with an intake/discharge port 23 provided in the lower portion of the front end, and the intake/discharge port 23 is provided with an anti-fouling grille 17.

The lower rear end is provided with a curved transition 24. Hydrodynamic simulations confirm that in this area, the curved transition significantly reduces eddy currents in the bottom 11 of the housing, thereby increasing efficiency of drainage and energy absorption in the outlet chamber 26. It also reduces the hydrodynamic impact on the device.

A rotary electricity generator 2 is disposed above the housing, which is connected to stator 5 and the rotor 6 of the hydropower turbine by means of a sleeve 32 and a shaft 16 provided therein. The stator 5 and the rotor 6 of the hydropower turbine are provided in a hydropower turbine chamber 30 at the bottom of the rear section 28 of the inlet chamber 25.

A top 19 of the housing has a grate-shaped outlet chamber air vent 7 and an inlet chamber air vent 8.

Figure 2:
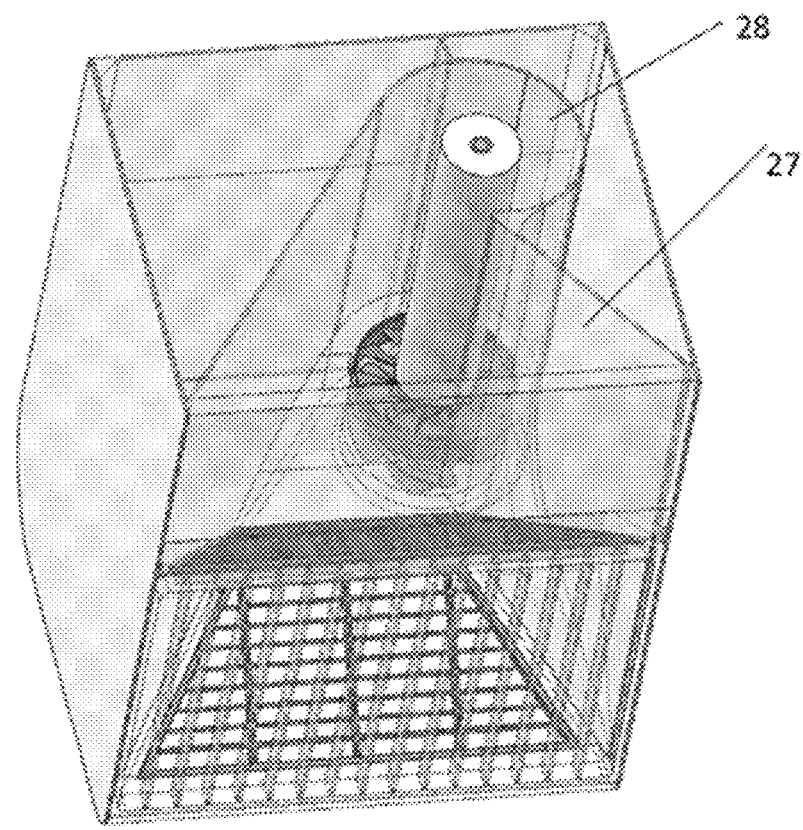
FIG. 2 is a schematic view of the wave energy conversion device depicted in FIG. 1 with the top cover being removed.

Referring next to FIG. 2, FIG. 2 is a schematic view of the structure of FIG. 1 with the top cover removed. In FIG. 2, the housing is provided with the intake/discharge port 23 at the lower part of the side facing the waves, and the wave energy conversion device has an inlet chamber 25 and an outlet chamber 26, and the inlet and outlet chambers 25, 26 are open to the sea to absorb wave energy through a pair of one-way flow guiding grates 3, 4 installed on the two chamber openings. A hydropower turbine is fitted between the two chambers 25, 26 to convert the hydrodynamic energy between the two chambers 25, 26 into mechanical energy. Above the hydropower turbine, the rotary electricity generator 2 is connected to the hydropower turbine via the sleeve 32, and the shaft 16 is disposed within the sleeve 32 to convert the mechanical energy into electrical energy. This design allows the rotary electricity generator 2 to be placed above the housing, thereby protecting the generator 2 from being submerged in seawater in most cases, and prolonging its life and reliability.

The inlet chamber 25 has a front section 27 and a rear section 28. The front section 27 and the rear section 28 together form the inlet chamber 25. A top portion 28 of the rear section 28 is provided with a through-hole 29 through which the shaft 16 and the sleeve 32 provided in the rear section 28 are connected to the rotary electricity generator 2 disposed above the housing. A hydropower turbine chamber 30 is located at the bottom of the rear section 28. A stator 5 and a rotor 6 of the hydropower turbine are configured to be connected to the shaft 16. The hydropower turbine chamber 30 communicates the inlet chamber 25 with the outlet chamber 26.

A cross-section of the front section 27 of the inlet chamber 25 is a quadrilateral. A longer edge of the quadrilateral is located on the front wall of the housing facing waves, and a bottom of the front section 27 is provided with the one-way flow guiding grate 3 slanting in a front-higher and rear-lower orientation. A cross section of the rear section 28 is surrounded by a length of helix, with a first end portion and a second end portion of the helix tangent to and intersect with the two side edges of the corresponding quadrilateral in the cross-section of the front section 27. The front end of the rear section 28 is in fluid communication with the front section 27, and the bottom of the rear section 28 is in fluid communication with the bottom of the front portion 27. The helix is an involute helix, with the side tangent to the side of the cross-sectional quadrilateral of the front section 27 being an outer end and the side that intersects being an inner end of the involute helix. The top 19 of the housing includes with the inlet chamber air vent 7.

It should be appreciated that the above embodiment is a preferred embodiment of wave energy conversion devices and that in other embodiments, the inlet chamber may be of a different shape. The inlet chamber is sufficient to be wider at the front, and gradually narrows at the rear, with the bottom surface of the rear section being connected to the outlet chamber by the hydropower turbine chamber.

Figure 3:
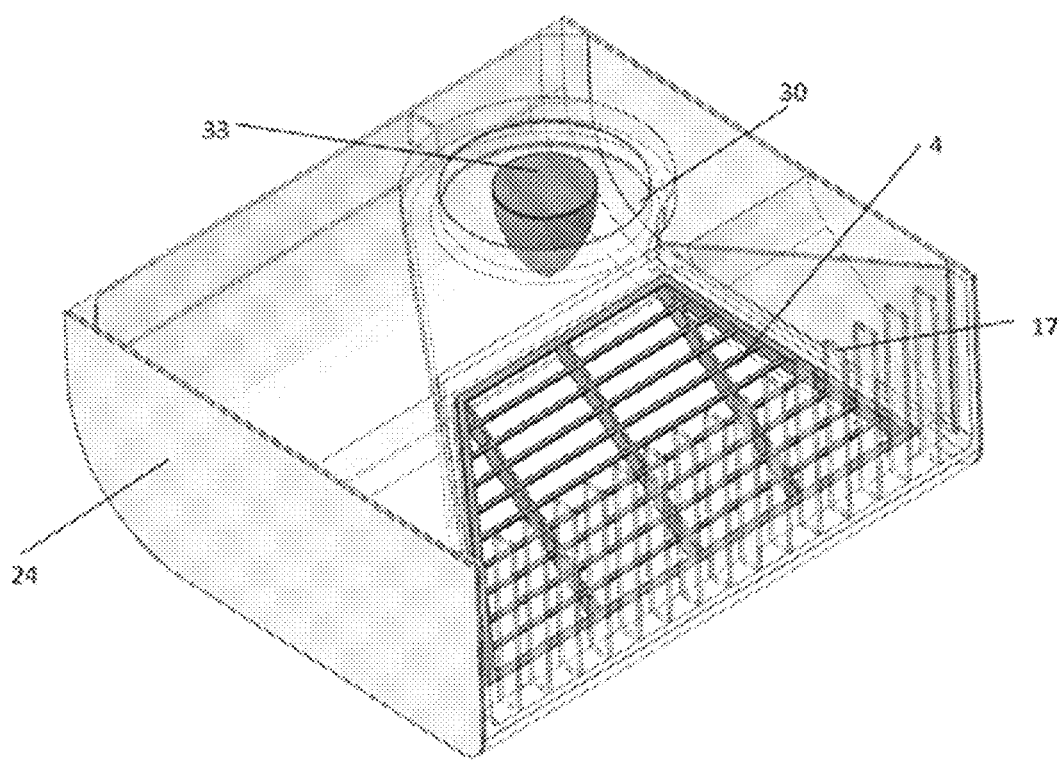
FIG. 3 is a schematic view of the bottom structure of the wave energy conversion device depicted in FIG. 1.

FIG. 3 is a schematic view of the bottom structure of the device depicted in FIG. 1. In FIG. 3 a bottom surface at the rear of the inlet chamber 25 can be seen with a hydropower turbine chamber 30 in which a rotor 6 of the hydropower turbine is provided. In the lower part of FIG. 3 is the bottom surface of the wave energy conversion device with a hydropower turbine slurry cap 33. The rear end of the bottom surface of the enclosure can be seen in FIG. 3 as having a curved transition 24. A one-way flow guiding grate 4 of the outlet chamber 26 and a fouling grille 17 of the intake/discharge port 23 can be seen in FIG. 3 as well.

In some embodiments, the one-way flow guiding grate structure of a wave energy conversion device functions the same as an inlet or outlet valve as in Chinese Patent No. 200880131611.2, wherein the one-way flow guiding grate 3 for the inlet chamber 25 is opened by the external wave pressure to unidirectionally take in the water when the wave is at the crest of the wave. When the wave is at the trough of the wave, the one-way flow guiding grate 4 of the outlet chamber 26 is opened by the difference of the internal and external pressures to unidirectionally discharge the water.

Figure 4:
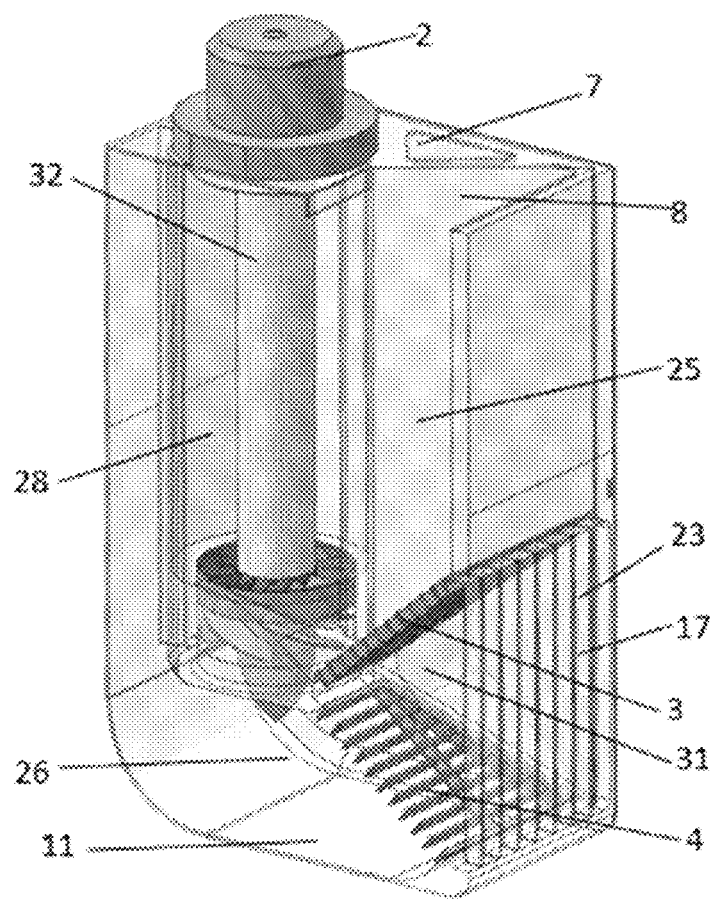
FIG. 4 is a schematic view of the wave energy conversion device depicted in FIG. 1 with one side being removed.

Referring next to FIG. 4, FIG. 4 shows a schematic view of the structure of FIG. 1 with one side removed. In FIG. 4 it can be clearly seen that the one-way flow guiding grate and the top and bottom of the energy alternating chamber 31 and the outlet chamber 26 are arranged in a transverse V-shape. The one-way flow guiding grates 3, 4 of the two chambers 25, 16 are at an angle to the ground surface, and the angle formed therein may range from 30 degrees (including 30 degrees) to 180 degrees. The one-way flow guiding grate 3 of the inlet chamber 25 is positioned above the one-way flow guiding grate 4 of the outlet chamber 26. Arrangements are made in the lateral vertical cross-section in a transverse V-shape progressively closer together. An inverted V-shape that changes from larger to smaller is formed in the horizontal cross-section. The V-shape herein refers to a structure that varies from wide to narrow, and the very narrow parts of the V are not necessarily connected. Internal reflected wave energy dissipation generated by the rear wall of the inlet chamber 25 is reduced. This setup alternates water in and out of the inlet chamber 25 and the outlet chamber 26 in turn by means of the energy alternating chamber 31, which enables the exchange of kinetic energy with the external seawater in the shared space. At the same time, while the total size of the intake/discharge port 23 at the front of the device (including the one-way flow guiding grates 3, 4) remains unchanged, the cross-sectional area through the one-way flow guiding grates can be increased because of the triangular relationship. As a result, more kinetic energy in the waves is captured, improving efficiency. In addition, the design can reduce the device's draft in use.

Figure 5:
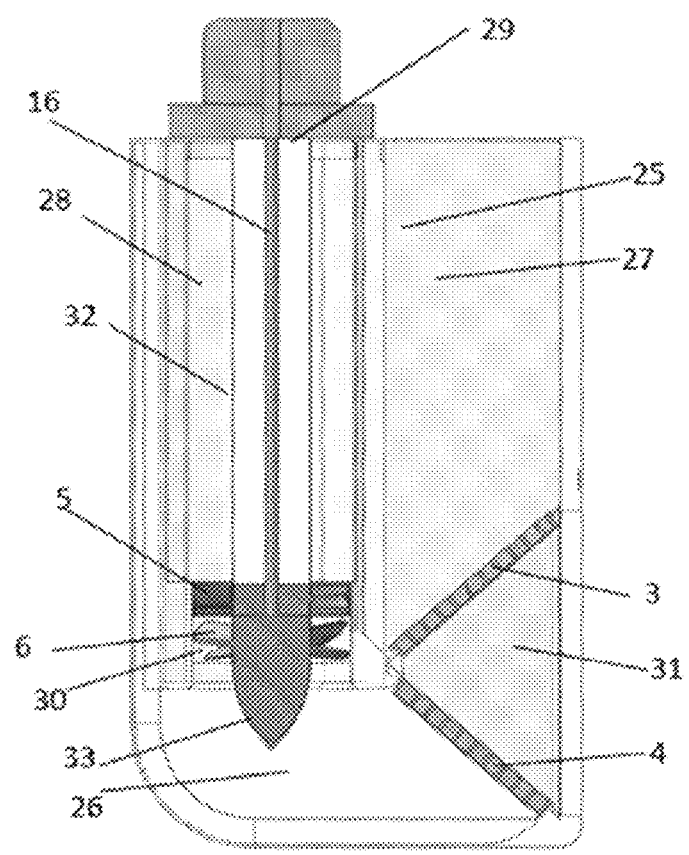
FIG. 5 is a longitudinal cross-sectional view of the wave energy conversion device depicted in FIG. 1.

FIG. 5 is a longitudinal cross section of the embodiment of FIG. 1. The structure of the hydropower turbine can be seen in FIG. 5. In this figure, the hydropower turbine uses a stator 5 paired with a rotor 6. Stator 5 is set in front of rotor 6 relative to the direction of the water flow, and stator 5 and rotor 6 have opposite angles of approach to the water flow. This pairing of the stator 5 with the rotor 6 optimizes the angle of incidence of the water flow at the rotor 6, reducing the kinetic energy loss of the water vortex at the rear of the turbine, and thereby increasing the efficiency of the turbine. This enables better conversion of kinetic energy in the water flow into rotational mechanical energy or torque. In the high-speed rotating vortex, the efficiency of the hydraulic turbine is greatly improved. Experiments have proved that increasing the hydropower turbine shaft sleeve diameter to a size between 0.25 and 0.5 times of the diameter of the hydropower turbine rotor can effectively improve the rotational kinetic energy of the water flow passing through the rotor.

The front section 27 of the inlet chamber 25 is wide at the front and narrow at the back to form an inverted V-shaped water inlet structure, which introduces water into the back section 28 of the inlet chamber 25 above the hydropower turbine, and one of the slanted sides of the front section 27 of the inlet chamber 25 is tangentially connected to the side of the back part 28 of the inlet chamber 25 to make the water rotate, and this structure minimizes the reflected waves generated by the bulkhead at the back of the inlet chamber 25, and a rotating body of water is formed above the hydropower turbine. Because the high-speed rotating vortex has a large moment of inertia, it can effectively reduce the swaying of the water body at the rear of the inlet chamber 25, making the water energy more stable, and thus providing more stable power output.

Figure 6:
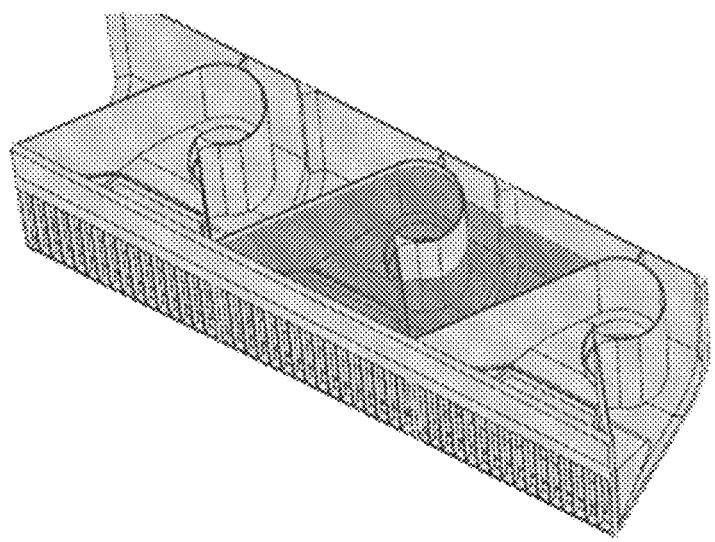
FIG. 6 is a schematic view of an embodiment of wave energy converters after removing the top cover.
Figure 7:
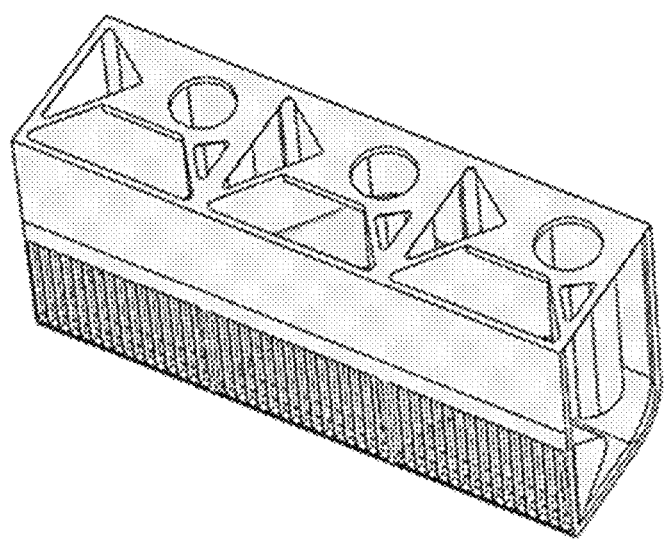
FIG. 7 shows a schematic view of the wave energy converters depicted in FIG. 6.

Referring next to FIG. 6, FIG. 6 is a schematic view of the structure of another embodiment of a wave energy conversion device with the top cover being removed. In the embodiment of FIG. 6, a plurality of wave energy converters, such as the embodiment of FIG. 1 with adjacent side housings removed, are connected side-by-side to form a larger set of wave energy converters, the appearance of which is shown in FIG. 7.

Although embodiments of wave energy conversion devices are disclosed above, they are not limited to the applications outlined in the specification and embodiments. It fully applies to various fields suitable for wave energy conversion devices. Additional modifications can be easily achieved by those familiar with the field. Therefore, without departing from the general concepts defined by the claims and equivalents, wave energy conversion devices are not limited to the particular details and illustrations shown and described herein.

What is claimed is:

1. A wave energy conversion device, comprising:
a housing having an inlet chamber and an outlet chamber, the inlet chamber having a first opening, and the outlet chamber having a second opening, each of the first and second openings being configured to face a front of the housing;
a pair of one-way flow guiding grates disposed at a front side of the housing;
a hydropower turbine disposed within the housing; and
a first one-way flow guiding grate disposed on the first opening, and a second one-way flow guiding grate disposed on the second opening,
wherein the first and second openings are oriented to form an angle ranging from greater than or equal to 30 degrees to 180 degrees, forming a transverse V-shape in a longitudinal cross-section of the housing,
wherein the first one-way flow guiding grate is configured to only allow water to enter the inlet chamber, and the second one-way flow guiding grate is configured to only allow water to exit the outlet chamber,
wherein from an intake/discharge port toward a rear wall of the housing, a flow passage becomes smaller,
wherein the inlet chamber and outlet chamber are in fluid communication with each other through a water channel, wherein the hydropower turbine is disposed within the water channel,
wherein the hydropower turbine is connected to a rotary electricity generator disposed above the housing through a shaft, and
wherein the inlet chamber and outlet chamber are disposed within the housing asymmetrically, and
wherein the inlet chamber is in fluid communication with outside through a first air vent disposed on top of the housing, and the outlet chamber is in fluid communication with outside through a second air vent disposed on top of the housing.

2. The wave energy conversion device of claim 1, wherein the inlet chamber includes a front section and a rear section,
wherein a first cross-section of the front section is quadrilateral, a wider front edge of the quadrilateral is located on a front wall of the housing,
wherein a bottom portion of the front section slanting in a front-higher rear-lower orientation,
wherein the first opening is defined in the bottom portion of the front section,
wherein a second cross-section of the rear section corresponding to the first cross section is surrounded by a length of helix,
wherein the quadrilateral of the first cross section having a first side edge and a second side edge, with the first side edge disposed on a tangent line of a first end portion of the length of helix, and a second side edge intersecting with a second end portion of the length of helix,
wherein a front portion of the rear section is in fluid communication with the front section,
wherein a bottom portion of the rear section is in fluid communication with the bottom portion of the front section,
wherein the water channel is disposed at the bottom portion of the rear section, the water channel includes a hydropower turbine chamber in which the hydropower turbine is accommodated.

3. The wave energy conversion device of claim 2, wherein the length of helix is an involute helix, the first end portion of the length of helix being the outer end of the involute helix, and the second end portion of the length of helix being the inner end of the involute helix.

4. The wave energy conversion device of claim 2, wherein a through hole is disposed in a top portion of the rear section of the inlet chamber, a hydropower turbine paddle shaft disposed in the rear section extending through the through hole and being connected to a rotary electricity generator disposed above the housing, a stator and a rotor of the hydropower turbine being connected to the hydropower turbine paddle shaft.

5. The wave energy conversion device of claim 4, wherein the hydropower turbine paddle shaft is disposed within a hydropower turbine sleeve, the hydropower turbine sleeve having an outer diameter of 0.25 to 0.5 times of a diameter of the rotor.

6. The wave energy conversion device of claim 2, wherein a remaining portion of the housing besides the inlet chamber, the energy alternating chamber and the hydropower turbine chamber forms the outlet chamber, a lower portion of the outlet chamber being in fluid communication with the bottom portion of the rear section of the inlet chamber through the hydropower turbine chamber.

7. The wave energy conversion device of claim 6, wherein a lower portion of the outlet chamber includes the second one-way flow guiding grate slanting in a front-lower rear-higher orientation toward a lower end of the intake/discharge port, with an upper edge of the second one-way flow guiding grate connected to a lower portion or the bottom portion of the inlet chamber.

8. The wave energy conversion device of claim 1, wherein the hydropower turbine employs a stator paired with a rotor, with the stator being disposed in front of the rotor relative to a direction of a water flow, the stator and the rotor being disposed in a manner such that the stator and the rotor are at opposite angles relative to the water flow.

9. The wave energy conversion device of claim 1, wherein the first one-way flow guiding grate of the inlet chamber and the second flow guiding grate of the outlet chamber are oriented in a transverse V-shape, forming an angle ranging from greater than or equal to 30 degrees to 180 degrees.

10. The wave energy conversion device of claim 1, wherein the intake/discharge port has an anti-fouling grille.

11. The wave energy conversion device of claim 1, wherein a bottom of the housing and a rear wall of the housing are connected at a curved transition.

12. The wave energy conversion device of claim 1, wherein a plurality of wave energy conversion devices are used in connection with each other.

* * * * *